United States Patent
Whitlock

[11] 3,963,263
[45] June 15, 1976

[54] AUTOMATIC BOAT-TRAILER LATCH

[75] Inventor: Russell U. Whitlock, Sacramento, Calif.

[73] Assignee: The Raymond Lee Organization, New York, N.Y.

[22] Filed: Dec. 16, 1974

[21] Appl. No.: 532,933

[52] U.S. Cl. .................. 280/414 R; 9/1.2
[51] Int. Cl.² .............................. B60P 3/10
[58] Field of Search .......... 280/179 R, 514, 414 R, 280/504, 509, 508; 9/1 T; 214/500, 84

[56] References Cited
UNITED STATES PATENTS

| | | | |
|---|---|---|---|
| 2,522,951 | 9/1950 | Knox | 280/509 |
| 2,564,702 | 8/1951 | Linneman | 280/414 R |
| 2,865,522 | 12/1958 | Peterson | 214/84 |

*Primary Examiner*—Robert R. Song
*Attorney, Agent, or Firm*—Stephen Wyden

[57] ABSTRACT

A boat can be automatically locked on a boat trailer by impacting the bow eye of the boat with the Automatic Boat Trailer Latch. The striker of the latch opens and permits the eye to enter and then closes, locking the boat on the trailer. Opening the striker permits the boat to be floated free of the trailer and launched.

2 Claims, 2 Drawing Figures

AUTOMATIC BOAT-TRAILER LATCH

I have invented a new and novel Automatic Boat Trailer Latch that will facilitate the loading and unloading of a boat on a trailer. When loading the boat on the trailer the boat automatically engages itself with the latch, locking itself onto the trailer and after releasing the latch, the boat can be easily launched as the trailer is slid into the water.

The invention can be best understood from the accompanying diagrams, in which

Figure 1:
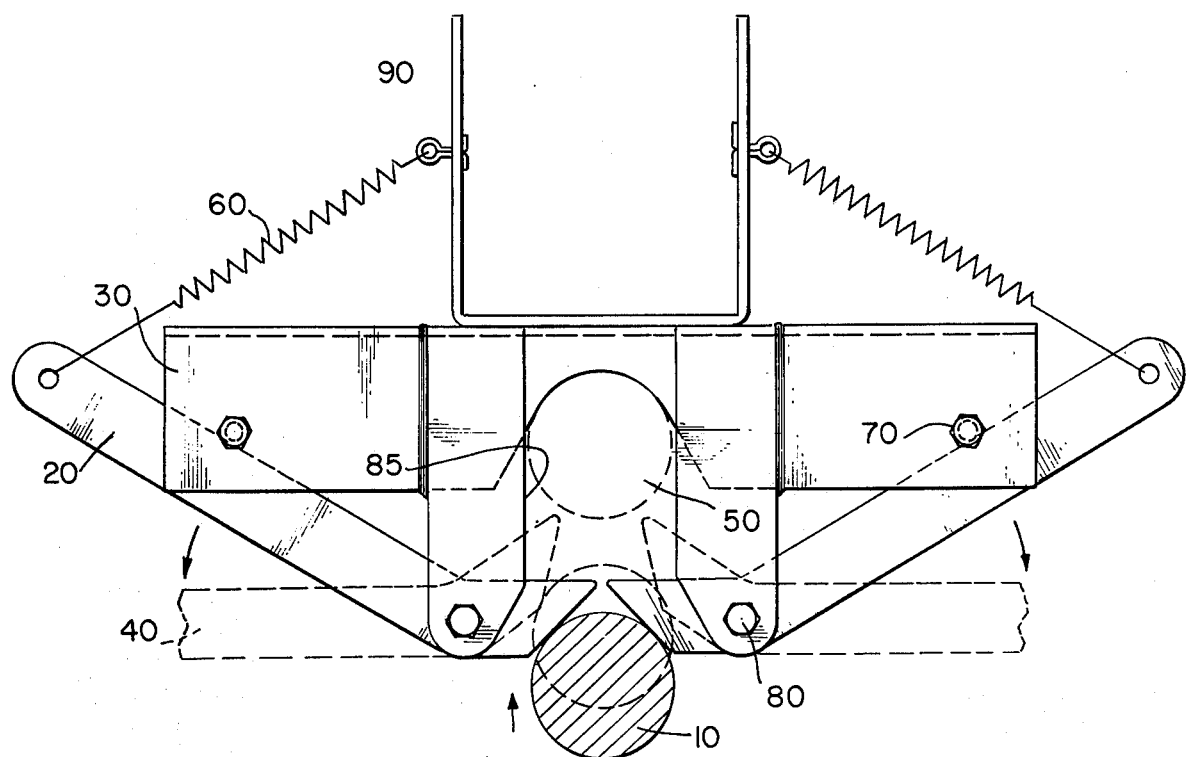
FIG. 1 is a view from the top, looking down on the latch.

In FIG. 1, when the bow eye of the boat (10) impacts on the closed, spring-loaded, strikers (20) of the latch (30), the strikers are forced into the open position indicated by the phantom (40) in the drawing and the bow eye can pass on through until the bow eye (50), indicated in phantom, has passed the latch strikers (40), allowing the latch strikers (40) to return to their original, closed, position (20), locking the boat on the trailer. The strikers (20) are kept in the closed position by the action of the tension springs (60) pressing the strikers (20) against the stop bolts (70). The strikers are pivoted on pivot bolts (80) which connect the strikers (20) to the body of the latch (30) at a forward end of an extension which forms a recess (85) for receiving the bow eye (50). The body of the latch (30) is attached to the bow post of the trailer (90) and the tension springs (60) are attached to the strikers (20) and to the sides of the trailer bow post (90). When the boat is to be returned to the water, manually moving the strikers to the open position (40) allows the boat to float free as the trailer is backed into the water.

Figure 2:
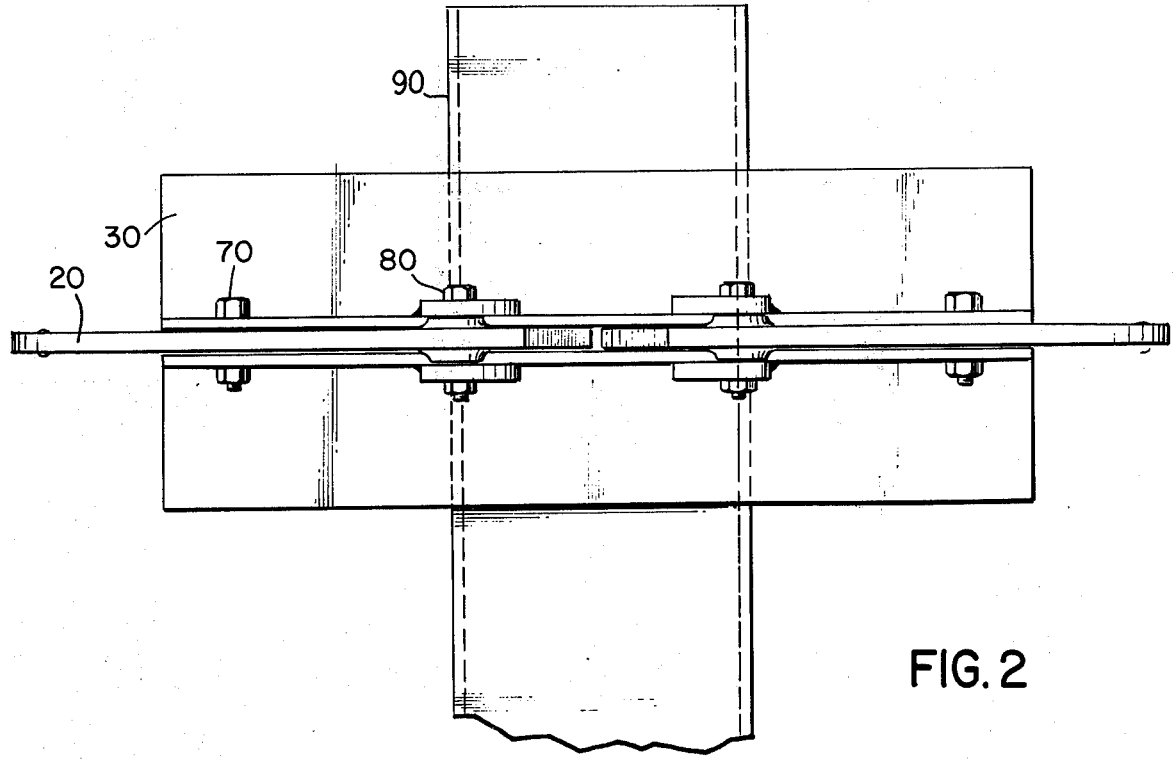
FIG. 2 is a front view of the latch.

In FIG. 2, the following parts of the latch are visible: the strikers (20), the latch body (30), the stop bolts (70), the pivot bolts (80), and the trailer bow post (90) to which the latch is attached.

Having thus fully described my invention what I claim as new and seek to secure by Letters Patent is:

1. A boat latch, comprising:

attached to a trailer bow post, a latch body forming a recess for receiving a boat bow eye, a striker pivotally mounted on the latch body at a forward end of the body which forms the recess, stop means of limiting the closing movement of the striker mounted on the latch body, and means of restraining the striker in the closed position yieldable to the boat bow eye and attached to the striker and the trailer bow post.

2. The boat latch of claim 1, wherein the means of yieldably restraining the striker is a tension spring.

* * * * *